United States Patent [19]
Polle

[11] Patent Number: 5,335,302
[45] Date of Patent: Aug. 2, 1994

[54] LIGHT WAVEGUIDE LEAD HAVING A FILLING COMPOUND AND METHOD FOR MANUFACTURE OF THE LEAD

[75] Inventor: Hubert Polle, Coburg, Fed. Rep. of Germany

[73] Assignee: Siemens Aktiengesellschaft, Munich, Fed. Rep. of Germany

[21] Appl. No.: 124,714

[22] Filed: Sep. 21, 1993

[30] Foreign Application Priority Data

Sep. 21, 1992 [DE] Fed. Rep. of Germany ....... 4231570

[51] Int. Cl.$^5$ ................................ G02B 6/44
[52] U.S. Cl. .................... 385/100; 385/141; 385/142; 174/23 C; 106/15.05; 106/287.1; 523/173; 524/474; 524/505
[58] Field of Search ............ 385/100, 102, 105, 106, 385/109, 110, 111, 112, 113, 114, 107, 108, 141, 142; 174/23 C; 106/15.05, 287.1; 523/173; 524/474, 476, 490, 491, 505

[56] References Cited

U.S. PATENT DOCUMENTS

| | | | |
|---|---|---|---|
| 4,331,379 | 5/1982 | Oestreich et al. | 385/109 |
| 4,370,023 | 1/1983 | Lange et al. | 385/100 |
| 4,382,821 | 5/1983 | Davis | 106/272 |
| 4,709,982 | 12/1987 | Corne et al. | 385/100 |
| 4,757,100 | 7/1988 | Wichelhaus et al. | 523/173 |
| 4,839,970 | 6/1989 | Goetze et al. | 385/100 |

FOREIGN PATENT DOCUMENTS 0029198 7/1984 European Pat. Off. .......... 385/100

Primary Examiner—Rodney B. Bovernick
Assistant Examiner—Phan Thi Heartney
Attorney, Agent, or Firm—Hill, Steadman & Simpson

[57] ABSTRACT

A light waveguide lead has at least one light waveguide accommodated within a protective sheath and this light waveguide is embedded in a pasty filling compound characterized by small balls being added to the compound, which balls are composed of a different material than the filling compound material. The diameter of the small balls and the number are selected so that the light waveguide has a displaceability within the filling compound that is adequate to allow stranding in other processes to the light waveguide lead.

25 Claims, 2 Drawing Sheets

LIGHT WAVEGUIDE LEAD HAVING A FILLING COMPOUND AND METHOD FOR MANUFACTURE OF THE LEAD

BACKGROUND OF THE INVENTION invention s directed to a light waveguide lead comprising at least one light waveguide accommodated w thin a protective sheath that is embedded in a paste-like filling compound.

U.S. Pat. No. 4,370,023, whose disclosure is incorporated herein by reference thereto and which claims priority from the same German Application as European Patent 0 029 198 B1, discloses that light waveguides that are arranged within a protective sheath can be fi led with a spec f c filing compound or lead filling compound that is composed of a mixture of an oil, a thixotropic agent and an organic thickener. The demands which are made on such a lead filling compound are high because, first, the light waveguide should have adequate mobility within the filling compound so that the filling compound should, thus, be selected with an optimally low viscosity. However, the anti-drip reliability must also be assured for such a lead filling compound so that the lead filling compound dare not, even given vertical laying of the cable, move out or drip out of the interior of the protective sheath surrounding the light waveguide. The adequate resistance to dripping, on the one hand, and the gentle embedding of the light waveguide, on the other hand, in the filling compound must be guaranteed over a broad temperature range, for example from −40° C. through +80° C.

In order to do justice to these demands, the filling compounds are manufactured of extremely high-grade substances, and this results in the fact that such filling compounds are relatively expensive.

In addition to lead filling compounds which are in immediate contact with the light waveguides, there also are what are referred to as core filling compounds that will fill the interspaces between electrical or optical leads and the outside cladding of the cable. For example, they are introduced into corresponding core spaces between these leads. Far lower demands are made of such core filling compounds than the demands which are made on the lead filling compounds, because, even in optical cables, the core filling compounds are not in immediate contact with the light waveguide but only in contact with potential protective sheaths of the light waveguides. In conjunction with such core filling compounds, German Patent 31 50 909 C2 discloses that hollow members can be introduced into the filling compound, whose walls, for example, can be composed of elastically viscous thermoplastics, thermoelastics or elastomers. The hollow members that are employed have an average diameter of approximately 40 $\mu$m and a wall thickness of 0.6 $\mu$m.

SUMMARY OF THE INVENTION

The present invention is directed to providing a filling compound for light waveguide leads which can be more economically manufactured than the known lead filling compounds and which is, nonetheless in the position of satisfying the extremely high demands made on the fi ling compounds for the light waveguides. According to the invention, which is directed to a light waveguide lead having one or more light waveguides disposed in a protective sheath w th a filling material, the improvements comprising small balls being embedded into the filling material for the formation of a lead filling compound, these balls being composed of a different material than the filling material and having a diameter of the balls and their number being selected so that the light waveguides can be displaceable within the lead filling compound adequately for any motion event.

The employment of small balls in the filling material, first, has the advantage that the viscosity of the lead filling compound can be raised. The reason for this is essentially that the actual pasty filling material, i.e., the initial or basic material without the small balls, is largely mechanically prevented from flowing by the embedded small balls, and this practically corresponds to a higher viscosity. At the same time, however, it is essential that the viscosity of the actual lead filling compound that forms the basis with respect to the mobility of the light waveguide in the inside of the protective sheath because the relatively stiff light waveguides can displace the small balls at any time given a potential movement without inadmissibly high forces being exerted on the light waveguide as a result of this displacement process. The displacement process can occur, in particular, during the stranding or laying procedure as well as, for example, of length modifications caused by temperature fluctuation. An increased viscosity is especially significant, particularly for passing the run-out test or drip test.

As a result of the insertion of small hollow balls provided according to an especially advantageous embodiment of the invention and that the small hollow balls have a specific weight generally lower than that of the filling material, the specific weight of the filling compound of the invention is also greatly reduced in comparison to purely pasty filling materials. In the run out or drip test, a defined length of the hollow lead is vertically suspended and the behavior of the filling compound is investigated up into the uppermost temperature range. When the specific weight of the filling compound within the suspended lead is lower, the weight of the filling compound residing practically as a column within the lead is lower and, thus, the force that leads to dripping is also reduced or lower. It is, thus, possible within the framework of the invention to employ initial or basic compounds that would not pass the drip test by themselves as a consequence of excessively low viscosity but which, in fact, raise the viscosity when mixed with small hollow balls and simultaneously reduce the specific weight of the "filling compound column", thus achieving the desired properties. Particularly given an adequate dense packing of the small balls, relatively narrow gaps are formed between them and these lead to a capillary effect and, thus, oppose drip-out. Liquid or semi-liquid substances can, thus, be introduced in the inside of the protective sheath as a filling material which would otherwise not pass the drip test, for example when only such filling materials are introduced by themselves. Such soft, nearly liquid filling materials, however, have the special advantage that they facilitate the mobility of the light waveguide during, for example, stranding or laying procedures because a solid member within a practically liquid compound can very easily shift its position. The resistance of the small balls potentially oppose to this displacement process of the light waveguide is generally significantly less than given an increase of the viscosity of the filling material for the purpose of passing the drip test without an addition of the small balls. Overall, a substantial improvement of the properties of the filling compound is achieved by the invention despite a possible reduction in price, namely an enhanced drip resistance given an at least preserved or even improved displaceability of the light waveguide within the filling compound at the same time. It s to be noted, in view of this displaceability, that the plurality of light waveguides and/or their diameters are selected so that the light waveguide retains a displaceability or mobility with n the lead filing compound that, for example, is still adequate for the stranding or laying process. The rule, thus, applies that the displaceability of the light waveguide decreases given increased diameter of the small balls and that the mobility of the light waveguide, likewise, decreases after a certain limit value given an increasing plurality of small balls within the fi ling compound. Large and excessively rigid small balls should be expediently avoided so that the light waveguides are not locally bent out.

In an expedient development of the invention, small ball are employed whose outside diameter lies below 10 $\mu m$ given complete spheres. It is especially advantageous when the small balls are even selected so that their outside diameter lies below 1 $\mu m$. Compared to coated light waveguides whose outside diameters lie are in the order of magnitude of approximate 250 $\mu m$, thus, the small balls are always so disappearingly small that they cannot oppose movement of the waveguide or provide any resistance which would potentially damage the light waveguide given a potential motion of the light waveguide and, above all, cannot locally cause a deflection of the light waveguide and, thus, avoid increasing the attenuation due to micro-bending.

It is also expedient in this context to select the surfaces of the small balls to be as smooth as possible and not rough in order to assure that these can glide as easily as possible against one another when a displacement of the light waveguide within the filling compound occurs. Rough or cloven surfaces of the small balls are, thus, best avoided because these can inhibit the motion event.

The invention is also directed to a method of manufacturing light waveguide leads which is characterized in that the protective sheath is applied by extrusion and in that the lead filling compound is introduced into the protective sheath through an extruder head of the extruder.

Other advantages and features of the invention will be readily apparent from the following description of the preferred embodiments, the drawings and claims.

DESCRIPTION OF THE PREFERRED EMBODIMENTS

Figure 1:
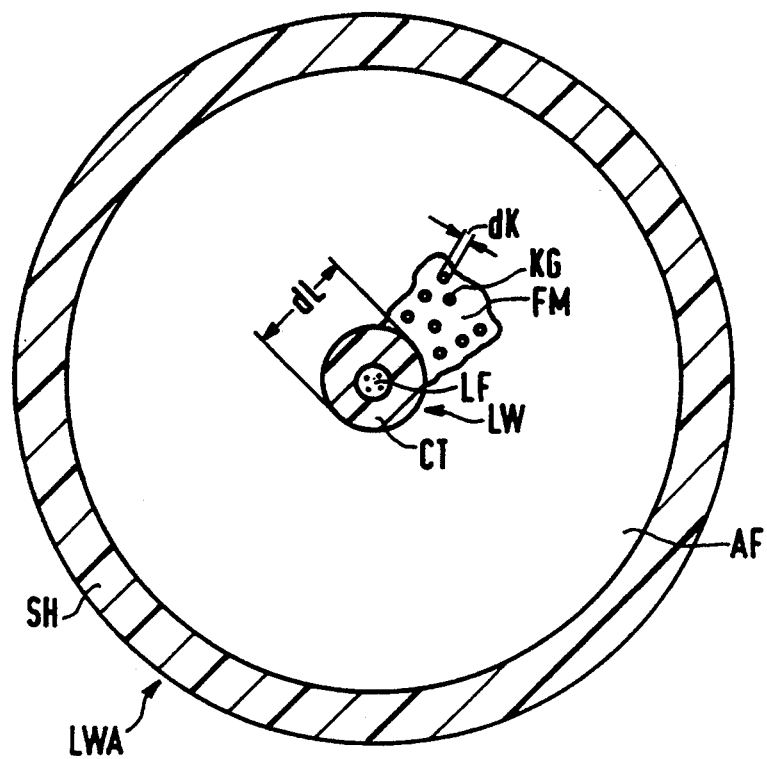
FIG. 1 is a cross sectional view of a waveguide lead in accordance with the present invention.

The principles of the present invention are particularly useful when incorporated into a light waveguide lead, generally indicated at LWA in FIG. 1. The light waveguide lead LWA comprises an outer single-layer or multi-layer protective sheath SH of plastic material. At least one light waveguide LW that s composed of an actual optical fiber LF and of a protective coating CT applied thereon is provided in the inside of the protective sheath SH. The light waveguide LW should be movably arranged within the protective sheath SH, to which end the interspace between the inside wall of the protective sheath SH and the light waveguides is filled with a lead filling compound AF. The lead filling compound AF contains a portion of a pasty mater al, and this portion can advantageously have the composition as disclosed in greater detail in the above mentioned U.S. Pat. No. 4,370,023. For example, it is essentially contained of an oilcontaining portion, of a thixotropic agent and of an organic thickener. In order to achieve an optimum good mobility of the light waveguide LW within the filling material FM, this filling material should be selected with the lowest possible viscosity. Due to the necessary anti-drip resistance for the drip test on the other hand, however, a certain minimum viscosity and liquid limit must be observed in order to prevent a run out of the filling compound. Since, moreover, these properties must be guaranteed over a relatively great temperature range, the price of such a filling compound is relatively high.

Alleviation can be created here in that small balls KG are mixed into the filling material FM to form the lead filling compound AF. In FIG. 1, only a small sub-region of the total inside of the light waveguide LWA is illustrated as containing the small balls and the filing material FM to simplify the illustration. The small balls KG embedded into the filling material FM are composed of a different material than the filling material and their diameter or their number or plurality are selected so that the light waveguide LW is displaceable within the filling compound that is adequate to allow adequate movement for stranding and laying purposes. An extensive range of design possibilities for the lead filling compound AF occurs as a result of the addition of the small balls, and these are set forth in greater detail below. Diameter of the Small Balls:

The diameter of the Small Balls KG is to be selected so that they do not offer any noteworthy resistance to the movement of the light waveguide. For example, so that no local pressure stressing and no local bending of the light waveguide and, thus, no increase n the attenuation will occur. Th s means that the small balls are expediently selected significantly smaller than the light waveguides so that the outside diameter dk of the small balls, when fashioned as relatively hard solid spheres is selected below 10 $\mu m$ and, preferably, below 1 $\mu m$. Since a light waveguide having a larger diameter of dL is more likely to be in the position, for example given a bending process, to displace the filing compound together with the small balls, the ratio dL:dk is expediently selected to be at least 25:1 and, preferably, at least 250:1 . It is thereby assured that the light waveguide, due to its stiffness, is always in the position to displace the significantly smaller balls without an excessively great increase in resistance to its movement. Elastic hollow small balls can be selected comparable to the light waveguide diameter in diameter, for example, up to approximately 200 $\mu m$. The minimum diameter should be selected greater than 1 $\mu m$, preferably greater than 10 $\mu m$.
Viscosity In view of the viscosity, which plays an important part in the drip test, the small balls cause an increase in viscosity, since at least their walls are composed of solid material. For passing the drip test, a viscosity of the lead filling compound on the order of magnitude of 10 Pas at room temperature is currently required. When one proceeds on the basis of the filling compound that contains a liquid component, for example an oil, a thixotropic agent, for example a material sold under the trade name Aerosil, as well as an organic thickener, then the proportions of the expensive thixotropic agent can be reduced, which will lead to a lower viscosity, since the enhancement of the filling compound with the small balls causes the viscosity to return to the desired value. It is also possible to employ a less expensive oil as a component of the filling compound, for example an oil that is less viscous, because this influence which also reduces viscosity can, in turn, be compensated by the addition of the small balls KG. The composition of the filling compound, for example, can occur so that the pasty filling material FM has a viscosity of only 1 Pas, whereas the viscosity of the new lead filling compound AF now obtained due to the addition of the small balls rises to the required value on the order of magnitude of 10 Pas. Thus, the viscosity of the filling material FM can be selected lower, at least by a factor of 0.1, than the required viscosity of the lead filling compound AF.

Cost Advantage:

The price, of the filling compounds composed of oil, a thixotropic agent and an organic thicker lies between 8 and 30 German marks (DM) per kilogram, dependent on the respective demand. One liter of volume of small hollow balls, by contrast, cost less than 2 DM, so that a mixture of the small balls into the filling compound will lead to a substantial cost reduction.

Volume Proportion of the Small Balls

As a consequence of the lower price, it would be expedient to mix as many small balls KG as possible into the filling material FM. This, however, is opposed by the fact that an excessively high proportion of small balls, dependent on the type and viscosity of the filling material creates a correspondingly high resistance under certain circumstances to the displacement of the light waveguide, thus causing stressing. Given solid small balls, it must thereby be taken into consideration that this resistance becomes all the greater the larger the selected diameter dk of the small balls. Approximately the following ranges for the volume percentages of the lead filling compound AF are expedient for a diameter dk in a range of between 1 $\mu$m and 10 $\mu$m for the small balls composed of sol d material: Volume proportion of small solid balls is between 5 and 50 volume percent. What is valid given elastic small hollow balls having a diameter up to approximately 100 $\mu$m is a volume proportion of elastic, small hollow balls between 5 and 95 volume percent.

Gliding Quality of the Oil Constituent

The more glidable the oil constituent of the pasty filling material, the more small balls that can be added. It is, therefore, expedient to use especially glidable oils as the oil constituent of the pasty filling mater al FM and to use fewer sticky substances, because the sticky substances together with the embedded small balls would more likely lead to a filling compound AF that will inhibit the motion of the light waveguide LW.

STRUCTURE OF THE SMALL BALLS a) Rigid Solid Balls

Care must be exercised given the employment of rigid, solid small balls that these are significantly smaller in all instances than the diameter dL of the light waveguide and, preferably, have a diameter of 1 $\mu$m or less. For example, "MF spacers 1 $\mu$" sold by Ubitek Company of Uchte can be employed. These small balls are composed of a melamine formaldehyde resin. Since solid plastics thermally expand less than oily filling compounds by an approximate factor of 10, these materials for the small balls have the advantage that they have a lower thermal expansion. Whereas filling compounds that are heated during manufacture, for example due to the extrusion of the protective sheaths or the like, will shrink to a relatively great degree at the end of the manufacturing process during cooling, lead filling compounds having small balls exhibit these disadvantageous properties to a far less extent in accordance with the proportion of the small balls. Given normal, pasty filling materials, the formation of vac holes or cavities can even occur, for example in regions free of filling compound within the protective sheath. These cavities can lead, under certain circumstance, to an increase in attenuation of the light waveguides and to an unbeneficial run out behavior of the lead filling compound, as well.

b) Elastic, Small Solid Balls

The employment of elastic small balls has the advantage that, different from rigid small balls, they do not provide a resistance to the light waveguide as rigid particles given a displacement of the light waveguide, but can also elastically and, as warranted, plastically deflect. Particles having a larger diameter dk can, thus, be employed and their volume proportion of the filling compound can be selected higher than given rigid solid small balls. For example, small latex balls can preferably be employed and, preferably, these are polyisoprene, which are acquired from natural caoutchouc emulsion. Such small polyisoprene balls can absorb considerable quantities of the oil and, for example, can bond oil and can thereby become even more noticeably viscous and elastic. In terms of its lubricating properties and its properties that facilitate a motion of the light waveguide LW, the oil thereby practically continues to be present, whereas the oil is bonded to the small balls to a certain extent in view of the anti-dripping property and, thus, yields substantially more beneficial values.

c) Elastic and, thus, Compressible Small Hollow Balls

In addition to their high elasticity, small hollow balls having a thin wall of elastic material have the additional advantage that they have an especially low specific weight and, thus, reduce the specific weight of the lead filling compound. It is expedient in view of the necessary conveying processes during the manufacturing process to provide elastic and compressible small hollow balls so that optimally no small balls are destroyed during the filling process of the light waveguide leads LWA. Broken small balls would have correspondingly rough surfaces and would create a greater resistance, under certain circumstances, to the mechanical displacement of the light waveguide within the lead filling compound AF. Small hollow balls also have the advantage that they have a lower thermal conductivity. This brings a potential significance in view of the thermal stressing of the lead filling compound, for example, due to the extrusion process. Small hollow balls have the density that is in order of magnitude lower than that of the actual filling material FM, i.e., without the small ball s and, thus, enable a noticeable reduction of the specific weight of the lead filling compound AF and, thus, diminish the tendency of the lead filing compound to run out of the protective sheath SH under its own dead weight.

Gas-filled small hollow balls usually have an even noticeably greater elasticity when compared to solid small elastic balls and, above all else, they are also largely compressible. Due to these compressibility processes, they will create substantially lower forces to apply against the light waveguide given a spatial displacement than do, for instance, elastic solid small balls or rigid small balls. It is, thus, possible to employ small balls having a larger diameter dk when these are gas-filled, highly compressible and highly elastic. For example, greater values in the area of 50 μm can be provided. In this case, thus, volume percentage between small balls kg of 5% to 95% and filling material FM of 95% through 5% are, thus, possible. The volume share of the small balls can be selected within broad limits and can noticeably exceed the dense possible packing of the small balls. In many instances, it can already be adequate whenever the small balls have their outside surface slightly oiled, since they will easily slide past one another due to their easy deformability given a movement of the light waveguide LW and also allow the light waveguide to easily slide past them, whereby great forces do not occur, since both the gliding is facilitated per se and is also enhanced by the easy deformability of the small balls. A further advantage of employment of small balls is that these small balls are compressed by the conveying pressure during the conveying process, which occurs when filling the protective sheath SH and, as a result whereof, the semi-liquid parts of the lead filling compound can be increased in this condition and mixtures having high volume percentages of small balls can, thus, still be conveyed. The high compressibility has the additional advantage that the lead filling compound AF is compressed somewhat as a whole when the protective sheath SH is applied and the small balls have enlarged somewhat in diameter, for example due to the extrusion heat, so that a remaining compression of the small hollow balls is sure to exist during cooling and no cavities can, thus, occur within the lead filling compound AF. In protective sheaths that have been completely filled at room temperature, a further advantage is that the pressure raises only slightly at higher temperatures because the increase in volume of the pasty filling material FM is intercepted or compensated by the reduction in volume of the small hollow balls. As a result of the above-mentioned advantageous property of the small hollow balls, the formation of the vac holes or cavities on the inside of the protective sheath are avoided and discontinuous fills of the inside can also not occur, which would potentially lead to micro-bending and sticking of the light waveguide to the wall and, thus, to increase the attenuation of the light waveguide.

Since small hollow balls have only slight proportions of solids and are otherwise composed of gas-filled bubbles, their addition to a liquid-filled filling material FM causes a reduction of the thermal conductivity and of the heat capacity of the lead filling compound obtained in this way. This results in that a great quenching of the inside wall of the tubular protective sheath will not occur when extruding the protective sheath SH, as in the case given the employment only of the pasty filling materials FM. As a result of the low thermal conductivity, semi-liquid compounds can also be employed, and their problems of decomposing under high temperature stresses and of run out proof are no longer present.

Thixotropic and Thickening Agents

In order to achieve the necessary anti-drip property, the employment of extremely fine particulate thixotropic agent is required, given standard lead filling compounds without small hollow balls; however, this is correspondingly expensive. Instead, highly dispersed silicon dioxide $SiO_2$ is normally employed, for example sold under the trade name "Aerosil" by the Degussa Company, whereas simpler thixotropic agents can be employed as well given lead filling compounds having small hollow balls. For example, thixotropic agents that are composed of lamina-shaped parts, such as, for example bentonite or kaolin can be employed. It is also possible to employ tubular particles, such as, for example, halloysite, which is an aluminum silicate hydrate, or mixtures composed of loose pack rigs of balls, such as, for example, gamboge, polyamides, polysacarides or polystyrol isoprene caoutchouc. Finally, hydrated caster oil can also be utilized as a thickener.

Another possibility in view of the employment of simpler thixotropic agents and thickeners is the employment of shock-cooled compounds. For example, a low-molecular polymer, for example polyethylene, s thereby dissolved in a liquid paraffin at approximately 150° C. The solution is cooled to room temperature within one to two seconds. Extremely fine PE particles are thereby formed, and these will agglomerate to form a network and yield a gel structure. The disadvantage of such a comparatively inexpensive compound is that the gel structure is destroyed when it is heated up to the proximity of the crystallite melting point of the polymer or, for example, 110° C. in the case of PE and, in turn, is slowly cooled. The reason for this may be seen wherein that larger PE particles are formed. When one applies such a compound to a light waveguide and extrudes a protective sheath on them, then the gel structure is destroyed by the elevated extrusion temperature at least in the region adjacent the tube wall. The mixture of small balls, particularly small hollow balls, will provide the advantage that the thermal conductivity of the lead filling compound becomes noticeably lower as a result thereof and the agglomeration or decomposition of the polymer particles is distributed or, respectively, avoided. It, thus, becomes possible to manufacture drip-proof and far cheaper lead filling compounds.

A further possibility is the addition of small hollow balls to an easily crosslinked compound. The small hollow balls can, therefore, be added to one constituent before the mixing or to both during the mixing.

In a test, a mixture on the basis of the filling material FM being "LA 444", which is manufactured by the Huber Company and has a 20 volume percent small hollow balls added thereto. The light waveguide lead having an inside diameter of 2 mm passed the drip test up to 80° C. No noteworthy increase in the attenuation occurred in the thermal fatigue test in the temperature range from −40° C. through +70° C. In the cable, the light waveguides exhibit similar behavior at temperatures through −30° C. Similar results are also obtained when filling light waveguide leads having a 6 mm inside diameter.

Similarly good results can be achieved on the basis of a base oil of the DEA Company bearing the designation DEA A/75, wherein 3 weight percent thixotropic agent, such as "Aerosil" of the Degussa Company, and 2.75 weight percent, which equals 38 volume percent, small hollow balls, such as "Expancel DE" of the Expancel Noble Industries were employed.

Figure 2:
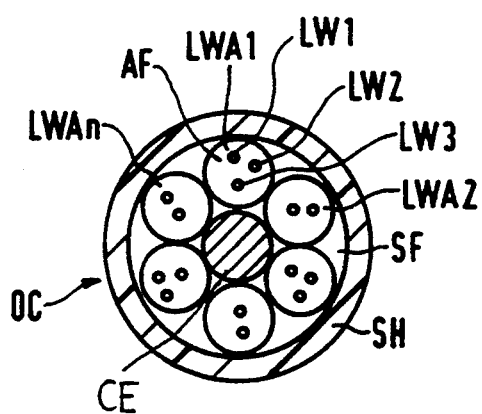
FIG. 2 is a cross sectional view of an optical cable having light waveguide leads of the present invention.

FIG. 2 shows a cross section of an optical cable OC that has a tensile element CE in the inside, as well as a number of light waveguides LW1 through LWAn stranded thereon. Each of these light waveguide leads contains at least one light waveguide embedded in a lead filling compound, wherein three light waveguides LW1, LW2 and LW3 are provided in the light waveguide lead LWA1. The lead filling compound AF contains small hollow balls and is introduced into each of these light waveguide leads LWA1 through LWAn so that, in addition, the outer gore spaces can be additionally filled with a core filling compound SF.

Figure 3:
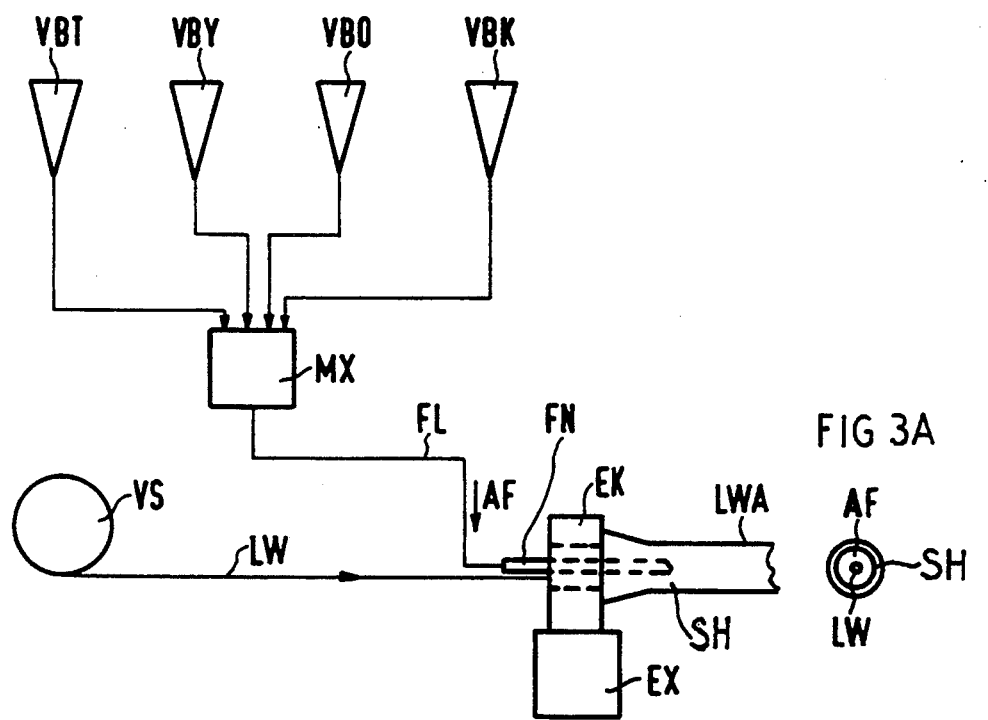
FIG. 3 is a schematic illustration of a manufacturing arrangement for the manufacture of the light waveguide leads in accordance with the present invention.
Figure 3A:
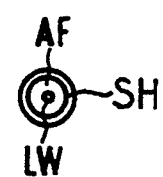
Fig. 3A is a cross sectional view of the lead manufactured by the arrangement of FIG. 3.

A production line for manufacturing a light waveguide lead of the invention is schematically illustrated in FIG. 3. The light waveguide LW is taken from a supply reel VS and is supplied to an extruder head EK of an extruder EX. The lead filling compound AF is applied onto the light waveguide at the output of the extruder head EK and the protective sheath SH is simultaneously extruded thereon.

The pasty filling material portion FM of the lead filling compound AF is expediently manufactured of three constituents that are taken from the corresponding reservoirs. Thus, a thixotropic agent, which can be in the form of finely-dispersed silicic acid or the like, is provided in a reservoir VBT. An organic thickener is provided in a reservoir VBY. An oil-containing liquid is provided in a third container or reservoir VBO. The small balls are provided for mixing into the pasty filling material FM and are contained in a fourth container VBK. The three basic substances and the small balls are brought together in a mixing means MX that is only schematically shown, and these elements are well blended together. The lead filling compound AF is supplied via a corresponding filling line FL to a filling needle FN that extends through the extruder head EK and extends at least into the distended cone from which the protective sheath SH is drawn. The lead filling compound AF is supplied at least under such high pressure that cavities or vac holes are reliably avoided during cooling, due to the expansion of the elastic, preferably hollow small balls KG.

The mixing of the individual constituents of the lead filling compound AF can be implemented in a variety of ways. One thereby proceeds in an especially expedient way that the thixotropic agent is first delivered into the mixing tank, some oil, such as a base oil, is then added. The shearing forces are so high in the stiff, mush-like compound obtained in this way that the thixotropic agent is finely dispersed when stirred. Later, more base oil is slowly jetted in while stirring and the small hollow balls are added at the end and are blended in as well.

Finally, it is also possible to prepare the lead filling compound AF in advance in a separate manufacturing process, which is unrelated to the actual lead production line and to directly connect the filling line FL to a corresponding reservoir that contains the completely prepared lead filling compound. Thus, the lead filling compound that already contains the small hollow balls is provided.

Small balls are advantageously employed that are initially not yet expanded, for example "Expancel DE" of Expancel Nobel Industries. These small balls expand given the application of heat, whether during the mixing process or, preferably, later due to the extrusion temperatures of the extruder head EK.

Mixtures composed of the filling compound LA 444 of the Huber Company and small hollow balls Expancel DE 551 were produced n the laboratory. It should only be mentioned here regarding the bas c mass that it has a density of 0.9 g/cm$^3$, whereas one liter of LA 444 costs approximately 9 DM, Expancel DE 551 is composed of small hollow balls of an essentially easily crosslinked PVDC having an average diameter of 40 μm, whereby the wall thickness amounts to approximately 0.6 μm Thus, the wall thickness to the size of the ball has a ratio similar to a 3 mm wall thickness for a soccer ball. The highly east c small balls have a true density of 0.0415 g/cm$^3$. The weight of the small ball lies in the region of $10^{-9}$ g. The price is 40 DM/kg, and one liter of the true small ball volume costs about 1.66 DM. Three different mixtures were calculated based on this data and two mixtures were produced and their viscosity was measured.

| Mixture | Proportion of Small Balls (volume percent) | Composition | Density (g/cm$^3$) | Viscosity (m Pas) | Price (DM/l) |
|---|---|---|---|---|---|
| | 0 | LA 444 | 0.9 | 9000 | 9.00 |
| 1 | 20 | 1000 g/111 cm$^3$ LA 444 1.13 g/27 cm$^3$ Expancel DE | 0.73 | 16000 | 7.54 |
| 2 | 30 | 100 g/111 cm$^3$ LA 444 2 g/48 cm$^3$ Expancel DE | 0.64 | 22000 | 6.76 |
| 3 | 50 | 100 g/111 cm$^3$ LA 444 4.6 g/111 cm$^3$ Expancel DE | 0.47 | | 5.29 |

Although various minor modifications may be suggested by those versed in the art, it should be understood that I wish to embody within the scope of the patent granted hereon all such modifications as reasonably and properly come within the scope of my contribution to the art.

I claim:

1. In a light waveguide lead comprising at least one light waveguide accommodated in a protective sheath and embedded in a pasty filling material, the improvements comprising the filling material having small balls embedded therein for formation of a lead filling compound, said small balls being composed of a different material than the filling material and the diameter of the small balls and their number being selected so that the light waveguide has a displaceability within the lead filling compound which is adequate for any movement applied to the light waveguide lead.

2. In a light waveguide lead according to claim 1, wherein the small balls are solid small balls and have an outside diameter selected less than 10 μm.

3. In a light waveguide lead according to claim 2, wherein the outside diameter of the small balls is below 1 μm.

4. In a light waveguide lead according to claim 2, wherein the ratio of the outside diameter of the light waveguide to the outs de diameter of the small balls amounts to between 25:1 and 250:1.

5. In a light waveguide lead according to claim 1, wherein the small balls are hollow small balls and have a diameter not greater than 200 μm.

6. In a light waveguide lead according to clam 1, wherein the surface of the small balls is optimally smooth.

7. In a light waveguide lead according to claim 1, wherein the small balls are fashioned as small solid balls and the small balls have a volume percent in a range of 5% to 50% of the lead filling compound.

8. In a light waveguide lead according to claim 1, wherein the small balls are elastic fashioned compressible hollow small balls.

9. In a light waveguide lead according to claim 8, wherein the elastic small balls are present in the lead filling compound in a volume percent range of 5% to 95%.

10. In a light waveguide lead according to claim 1, wherein the filling material of the lead filling compound has a viscosity which is below the required value for anti-drip properties for the lead filling compound.

11. In a light waveguide lead according to claim 10, wherein the viscosity of the filling material is selected lower by at least a factor of 0.1 than the required viscosity for the drip-proof property of the lead filling compound.

12. In a light waveguide lead according to claim 10, wherein the filling material is selected below 1 Pas.

13. In a light waveguide lead according to claim 1, wherein the filling material contains an oil with a good glidability.

14. In a light waveguide lead according to claim 13, wherein the material of the small balls is selected so that the material of the balls superficially bonds to the oil.

15. In a light waveguide lead according to claim 14, wherein the small balls are composed of polyisoprene.

16. In a light waveguide lead according to claim 1, wherein the filling material contains a thixotropic agent.

17. In a light waveguide lead according to claim 1, wherein the filling material contains a thickener.

18. In a light waveguide lead according to claim 1, wherein the filling material is employed which has such a high thermal conductivity without the addition of small balls that it will decompose at the extrusion temperature of the protective sheath and that the proportion of the balls in the lead filling compound is selected so that the lead filling compound practically no longer decomposes at the extrusion temperature of the protective sheath as a consequence of the reduction in the thermal conductivity of the lead filing compound due to the presence of the balls.

19. A method of manufacturing a light waveguide lead having an outer sheath with at least one light waveguide disposed therein and a lead filling compound comprising the steps of providing an extrusion head, conveying a light waveguide into the extrusion head and extruding a protective sheath around the light waveguide, conveying a lead filling compound having a filling material and small balls and introducing said compound into the protective sheath through the extruder head of the extruder.

20. A method according to claim 19, wherein the step of providing the lead filling compound supplies the compound under pressure.

21. A method according to claim 20, wherein the lead filling compound contains small elastic hollow balls, which are supplied compressed so as to prevent the formation of cavities and vac holes from occurring in the lead filling compound given the cooling that occurs after the extrusion of the protective sheath.

22. A method according to claim 19, wherein the small balls are supplied to a completely mixed filling material and are mixed therewith.

23. A method according to claim 22, wherein a filling material having proportions of the thixotropic agent mixed with oil and blended are subsequently mixed with the small balls.

24. A method according to claim 19, wherein non-expandable small hollow ball Is are introduced into the lead filling compound.

25. A method according to claim 24, wherein the small hollow balls are first expanded by the extrusion temperature.

* * * * *